United States Patent
Jericho et al.

(10) Patent No.: US 9,020,688 B2
(45) Date of Patent: Apr. 28, 2015

(54) CUSTOMIZED MESSAGE PROTOCOL IN MINING VEHICLE OPERATIONS

(71) Applicant: Caterpillar Inc., Peoria, IL (US)

(72) Inventors: Veronica Jericho, Queensland (AU); Glen Blanchard, Upper Coomera (AU); Nicolas Noben, Highgate Hill (AU)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/156,050

(22) Filed: Jan. 15, 2014

(65) Prior Publication Data

US 2015/0084787 A1    Mar. 26, 2015

Related U.S. Application Data

(63) Continuation-in-part of application No. 14/035,049, filed on Sep. 24, 2013.

(51) Int. Cl.
*G08G 1/123* (2006.01)
*G08C 17/02* (2006.01)
*G06Q 50/02* (2012.01)

(52) U.S. Cl.
CPC ............... *G08C 17/02* (2013.01); *G06Q 50/02* (2013.01)

(58) Field of Classification Search
USPC ............ 701/50, 32.2–32.5, 23–26, 465, 468, 701/469, 32.3; 340/988, 991
See application file for complete search history.

(56) References Cited

U.S. PATENT DOCUMENTS

| | | | |
|---|---|---|---|
| 6,484,078 B1 * | 11/2002 | Kageyama | 701/25 |
| 7,283,810 B1 * | 10/2007 | Arakawa et al. | 455/414.1 |
| 7,693,633 B2 * | 4/2010 | Donnelli et al. | 701/50 |
| D660,862 S | 5/2012 | Anzures | |
| D660,864 S | 5/2012 | Anzures et al. | |
| D662,944 S | 7/2012 | Quandt | |
| D665,818 S | 8/2012 | Anzures | |
| 2009/0088979 A1 * | 4/2009 | Koch | 701/224 |
| 2012/0136524 A1 * | 5/2012 | Everett et al. | 701/24 |
| 2014/0032061 A1 * | 1/2014 | Wulf et al. | 701/51 |

\* cited by examiner

*Primary Examiner* — Yonel Beaulieu
(74) *Attorney, Agent, or Firm* — Miller, Matthias & Hull LLP

(57) ABSTRACT

A communication system in a mining environment customizes messages and responses to both conserve radio bandwidth and to accommodate different communication terminal types in use. Messages to a loader with a communication terminal having a four line display and four keys may be tailored to the capabilities of the terminal, while a similar message to a foreman terminal with a full keyboard or a tablet touch screen display may include both more detail and a richer set of responses. To save bandwidth, common messages and responses can be pre-loaded onto the communication terminals so that many messages and responses can be transmitted using only the message identifier.

20 Claims, 14 Drawing Sheets

Fig. 12

CUSTOMIZED MESSAGE PROTOCOL IN MINING VEHICLE OPERATIONS

RELATED CASES

This application claims priority to U.S. patent application Ser. No. 14/035,049 filed on Sep. 24, 2013 which is hereby incorporated by reference for all purposes, and which is now allowed.

TECHNICAL FIELD

The current disclosure is generally related to the use of managing mining equipment and more particularly to the use of specialized messaging protocols for managing vehicle operations in a mining environment.

BACKGROUND

Mining is a complex operation. It requires large machines to undertake challenging tasks that are potentially dangerous. The machine can be hard to maneuver, the environment may be full of dangers and the machines are under significant stress.

At the same time, efficiency is becoming more and more important to mining operations. The cost of fuel is becomes a major factor as the distances that trucks travel between extraction equipment and unloading points can be significant. When trucks encounter long delays at endpoints while waiting to load or unload can further reduce efficiency in both unproductive equipment usage and idle fuel consumption. Conversely, extraction or processing equipment at endpoints that is idle while waiting for trucks to arrive further reduces efficiency.

Existing mine communications equipment relies primarily on voice communication. Current systems do not provide a comprehensive view of expected arrival times, current queue times, and machine efficiencies, nor support real time operational guidance based on those inputs. Reducing operator distractions while improving communication is a significant factor in safer and more efficient mining operations.

SUMMARY

In a first aspect, a method of communicating messages with machines having a communication terminal in a mining environment, may include determining a communication terminal type for machines capable of data communication in the mining environment, assigning the machines to communication groups by communication terminal type, and acquiring a message for distribution to one or more machines. The method may also include selecting a separate message format for the message for each communication group represented in the one or more machines, reformatting the message according to each selected separate message format, and sending the message to the machines.

In another aspect, a communication platform for communicating messages to and from a plurality of machines used in a mining environment, the communication platform may include a server having a physical memory, a processor, a user interface, and a network interface configured to send and receive messages via a network. The physical memory may store executable instructions and data that are used by the processor to cause the communication platform to receive, via the user interface, a message to be sent to the plurality of machines, to maintain characteristics of a message capability for each of the plurality of machines and to transform the message according to the message capability of a target machine of the plurality of machines. The processor may also be programmed to cause the communication platform to send the transformed message to the target machine.

In yet another aspect, a method of communicating messages with machines having a communication terminal in a mining environment may include determining a communication terminal type for machines capable of data communication in the mining environment and assigning the machines to communication groups by communication terminal type and machine type. The method may also include acquiring a message for distribution to one or more machines and selecting a separate message format for the message for each communication group represented in the one or more machines. A set of responses to the message may be developed and the set of responses may be customized based on the capability of the communication terminal type in each communication group. The message may be reformatted according to each selected separate message format the message may be sent to the machines along with a customized set of responses based on the communication group.

BRIEF DESCRIPTION OF THE DRAWINGS

FIG. 12 is a screen shot showing a messaging window and a detailed message window.

DETAILED DESCRIPTION

Figure 1:
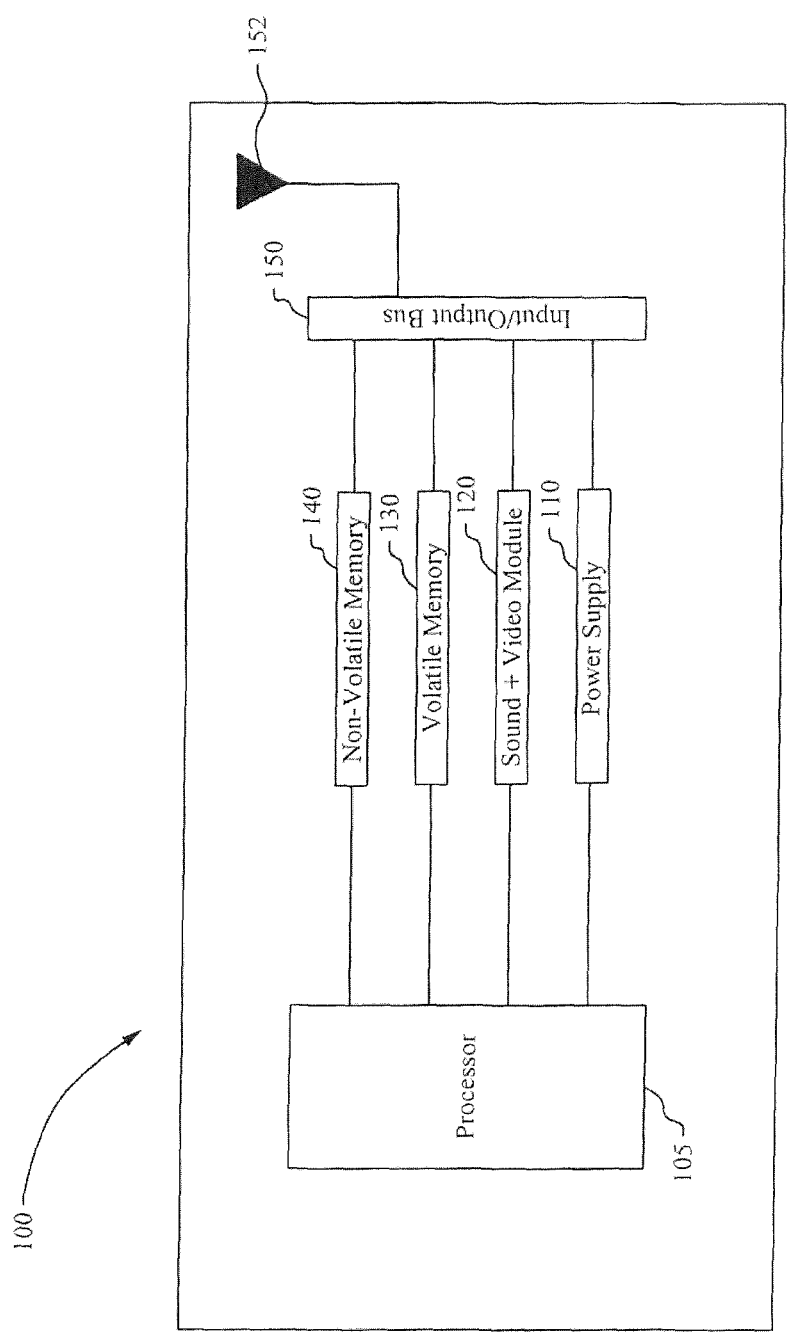
FIG. 1 is an illustration of a portable computing device.

FIG. 1 may be a high level illustration of some of the elements of a sample computing system. The computing system may be a dedicated computing device, a dedicated portable computing device, an application on the computing device, an application on the portable computing device or a combination of all of these.

FIG. 1 may be a sample portable computing device 100 that is physically configured according to be part of the system. The portable computing device 100 may have a processor 105 that is physically configured according to computer executable instructions. It may have a portable power supply 110 such as a battery which may be rechargeable. It may also have a sound and video module 120 which assists in displaying video and sound. The device 100 may turn off when not in use to conserve power and battery life. The portable computing device 100 may also have volatile memory 130 and non-volatile memory 140. There also may be an input/output bus 150 that shuttles data to and from the various user input devices such as a microphone, the inputs, etc. It also may control communicating via one or more networks, either through a wired interface (not depicted) or a wireless interface 152. Of course, this is just one embodiment of the portable computing device 100 and the number and types of portable computing devices 100 is limited only by the imagination.

Figure 2:
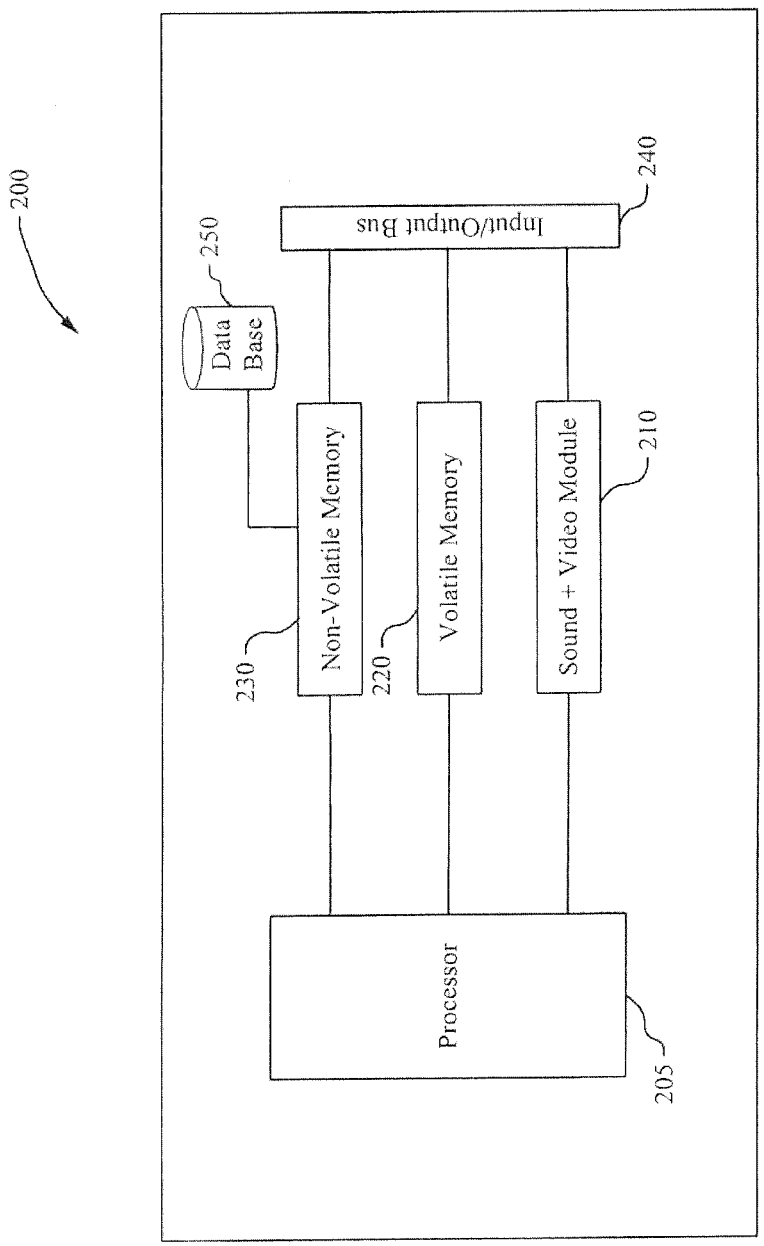
FIG. 2 is an illustration of a computing device.

FIG. 2 may be a sample server/workstation 200 that is physically configured to be part of the system. The server/workstation 200 may have a processor 205 that is physically configured according to computer executable instructions. It may also have a sound and video module 210 which assists in displaying video and sound and may turn off when not in use to conserve power and battery life. The server/workstation 200 may also have volatile memory 220 and non-volatile memory 230. The database 250 may be stored in the memory 220 or 230 or may be separate. The database 250 may also be part of a cloud of computing devices the same as or similar to the server/workstation 200 and may be stored in a distributed manner across a plurality of computing devices. There also may be an input/output bus 240 that shuttles data to and from the various user input devices such as the microphone, the inputs, etc. The input/output bus 240 also may control communicating with external networks 252, either through wireless or wired interfaces or other external network devices. Of course, this is just one embodiment of the server/workstation 200 and the number and types of such devices is limited only by the imagination.

The portable computing device 100, the server/workstation 200, or both, may be configured as an operator system useable for receiving and displaying data such as map and vehicle location information. Information received via the wireless network may be viewed at either a console in an operations center or at a Remote Foreman's Terminal.

Due to the unique operating conditions for the Remote Foreman's Terminal, a light-weight user interface may be used to deliver the specific functionality required. This user interface may not contain the full functionality of the full console version but rather may provide a simple, read-only access to a specific sub-set of functionality required by a Foreman from a remote location. This functionality itself may be reduced to accommodate for the potentially poor network conditions, e.g. the data refresh rates of the Site Monitor may likely be reduced for the Remote Foreman's Terminal.

Because both truck terminals and the Remote Foreman's Terminal are either inherently limited in function or the operators have minimal time to devote to messaging, use of a customized message protocol can be used to address these issues and optimize communication.

In an embodiment, a dispatcher or operator may be able to group messages by machine type, by communication terminal type, or both. This allows the operator to customize messages for a particular setting. For example, some terminals may have limited displays, so that abbreviated messages may be sent to that group of terminals while more complete messages may go to other terminals.

In another example, some terminals may only include only a few keys, prohibiting full text entry for a response. Messages may be sent with a selection of pre-determined answers so that the operator need only touch the button associated with the pre-determined answer. To illustrate, a message for a truck to return to the shop may include a canned responses such as "Confirmed" or "In an operation, will comply ASAP." In another illustration, a message such as "Data connection lost, confirm fuel supply," may have pre-determined answers of "fuel >½," "¼<fuel<½," and "fuel<¼." In yet another example, messages may be tailored to the terminal capabilities, that is, a terminal with eight programmable keys may have more detailed pre-determined responses than a terminal with 4 programmable keys.

In another embodiment, low bandwidth terminals may have the ability to load a number of text strings onto the terminal while docked so that the operator may only need to send a reference to one of several questions or statements and also send references to the text strings corresponding to selectable responses. Similarly, common inbound messages may also be pre-loaded onto the terminal so that a field worker or manager need only select a common inbound message from a list. That is, both outbound and inbound message text and/or graphics may be preloaded onto a terminal. Once selected at the terminal, only the reference needs to be sent back. That way, only minimal data in the form of references needs to be sent in either direction.

At an operator station, a user interface may accumulate messages sent over a wireless network to develop a database of standard queries/messages and their associated responses. Further, a user interface at the operator station may allow the operator to select outbound messages and acceptable responses from the database.

Figure 11:
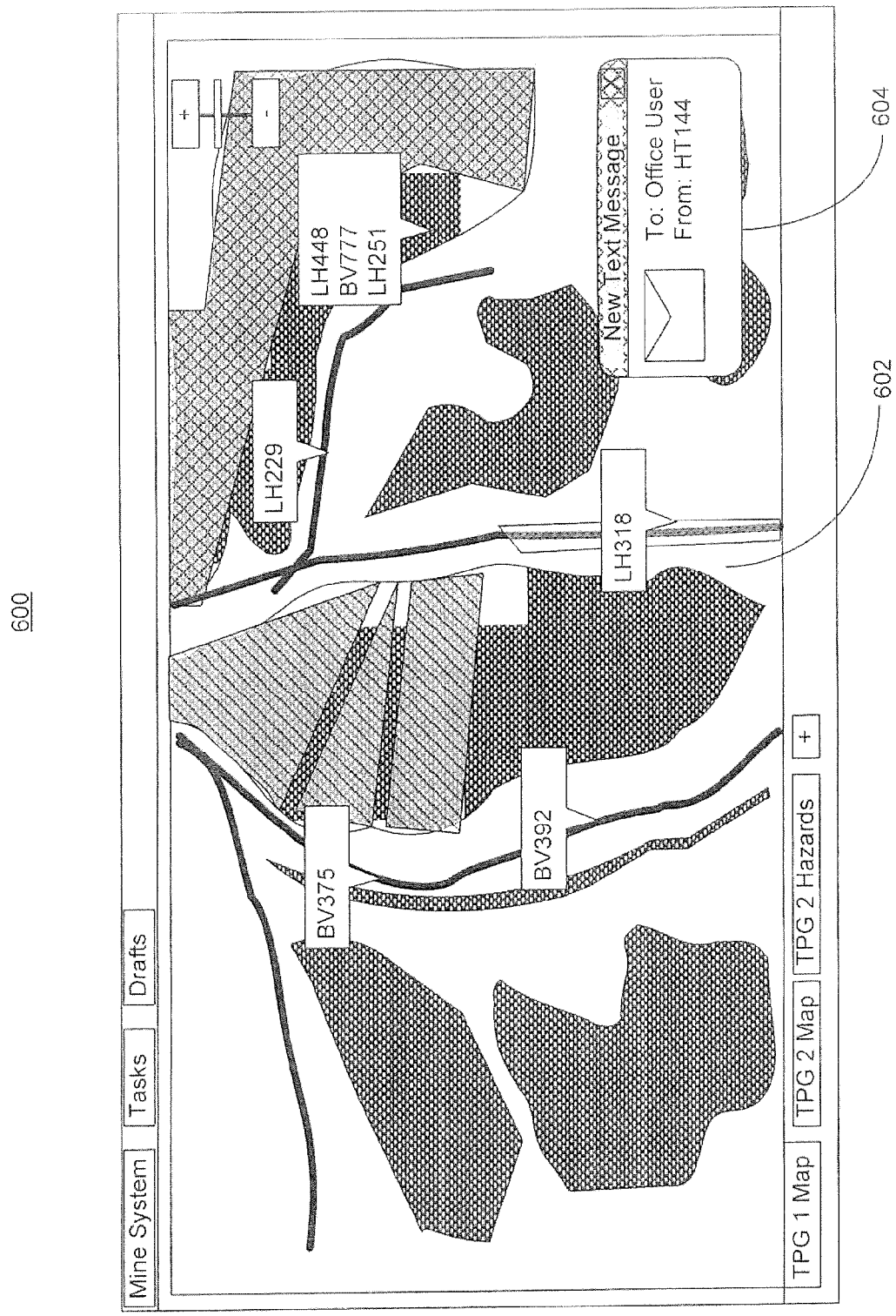
FIG. 11 is a screen shot of a map showing a messaging pop-up.

Turning to FIG. 11, a screen shot 600 of a map image 602 may include a pop-up 604 indicating a message is available for viewing. Even though the pop-up indicates a text message is available, as discussed above, the message, message format, and message protocol are unrelated to text messages as understood in a cellular telephone context. While cellular telephone text messages are limited to 140 characters and are carried, generally, on the control channel of a cellular telephone network, the messages of the currently illustrated system may be delivered over a variety of radio broadcast formats, such as WiFi, dedicated specialized mobile radio (SMR), wide area data networks, or in some cases, even cellular telephone data networks. In further contrast, as discussed above, the messages themselves may be coded for efficiency and may include a list, or coded list, of pre-determined responses.

Figure 12:
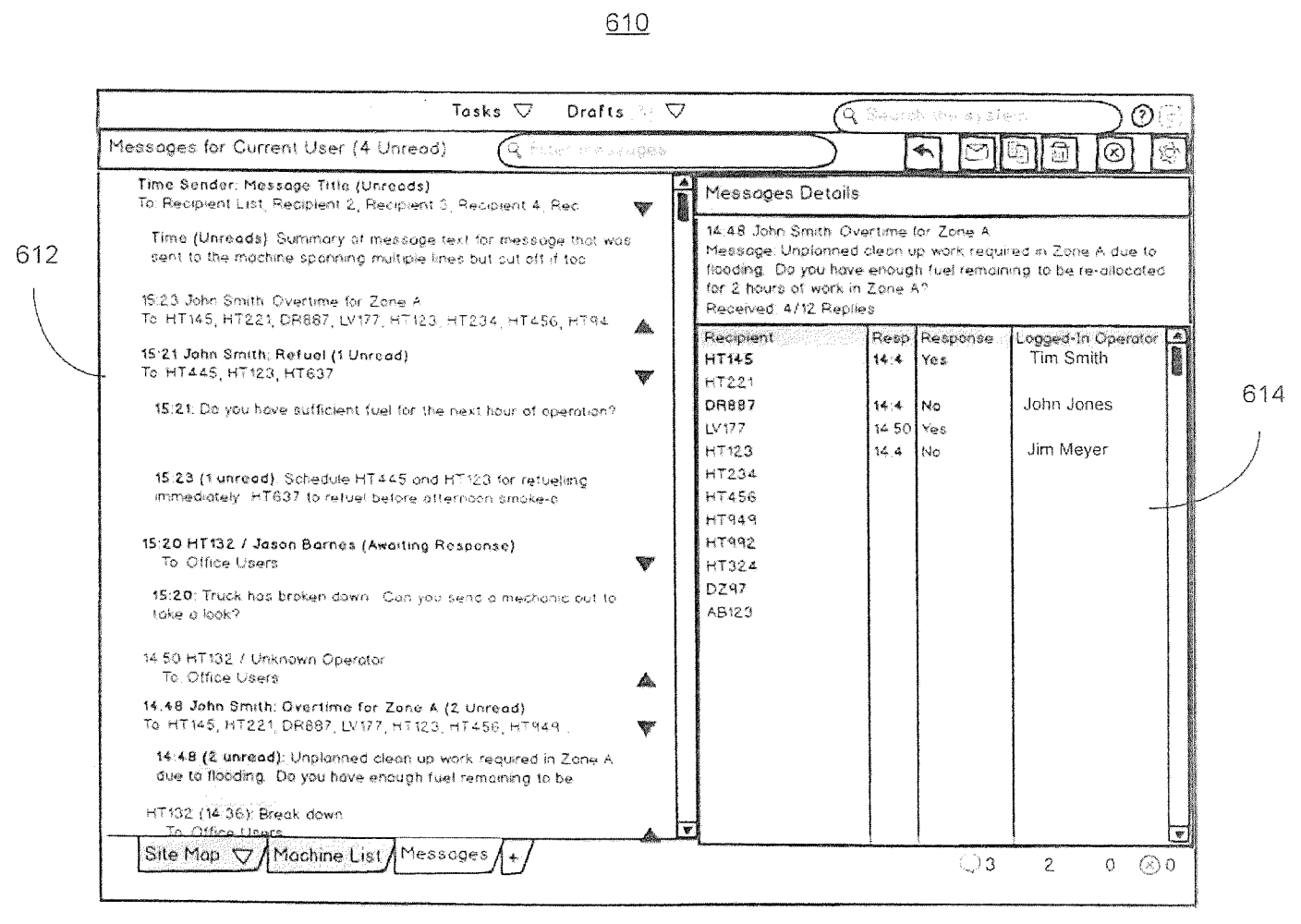

The map 602 of FIG. 11 may show an operator console with the location of different pieces of equipment and the pop-up 604 may allow an operator to decide whether to open the message by selecting the pop-up 604 or by going to a message screen, shown in FIG. 12.

Turning to FIG. 12, a screen shot 610 of a message window 614 and a message detail window 614. The message window 612 may have a simple list of all messages with timestamps. The message detail window 614 may have a list of all related messages, especially one-to-many messages from a dispatcher or manager where a single outbound message may have a number of inbound responses. In an embodiment, the message detail window may filter responses according to an expected response so that only anomalous or unexpected responses are displayed. For example, a request to report if fuel level is above or below one hour of operating time may group all "above" responses into a single line showing the number of response and only individually display "below" responses.

In an aspect, a mine equipment radio dispatching system may compose and group messages by equipment type or by terminal capabilities and format messages for each type or specific capability prior to transmission. For example, terminals with a 4 line by 80 character monochrome display may have the text of the message reduced to remove articles and other words that aren't significant to the meaning. In other cases, where the equipment type supports full screen color, graphics and color coding may be used to improve readability and context. When entering a message, either to be used immediately or for use as a 'canned' message which can be selected from a list of commonly used messages, an operator may be prompted to enter alternate text and/or graphics for different terminal types. Alternately, a message in one format may be automatically modified, for example, a lowest common denominator message for a 4 line monochrome display may be enhanced to use color and graphics to highlight message text and response text, if any.

The messages may also include pre-determined responses based on the capability of the terminal. That is, response text may be pre-developed for the different terminal types, such as but not limited to, paring down the number of responses or developing monochrome-only versions. To illustrate, a machine with only 4 programmable keys may use a limited list of responses, where a full sized touchscreen may allow more alternatives and graphical organization of responses for easy selection by an operator.

The capability of a terminal or terminal type may be characterized by several factors including screen size, graphics capability, color capability, touchscreen or keys, number of programmable keys, alphanumeric keyboard, etc.

In another aspect, a dispatcher or manager station may group messages by response and separately report only those messages whose content meets a filter criteria. Those messages whose content does not meet the filter criteria may be counted and the count displayed, but may not be displayed individually.

Figure 13:
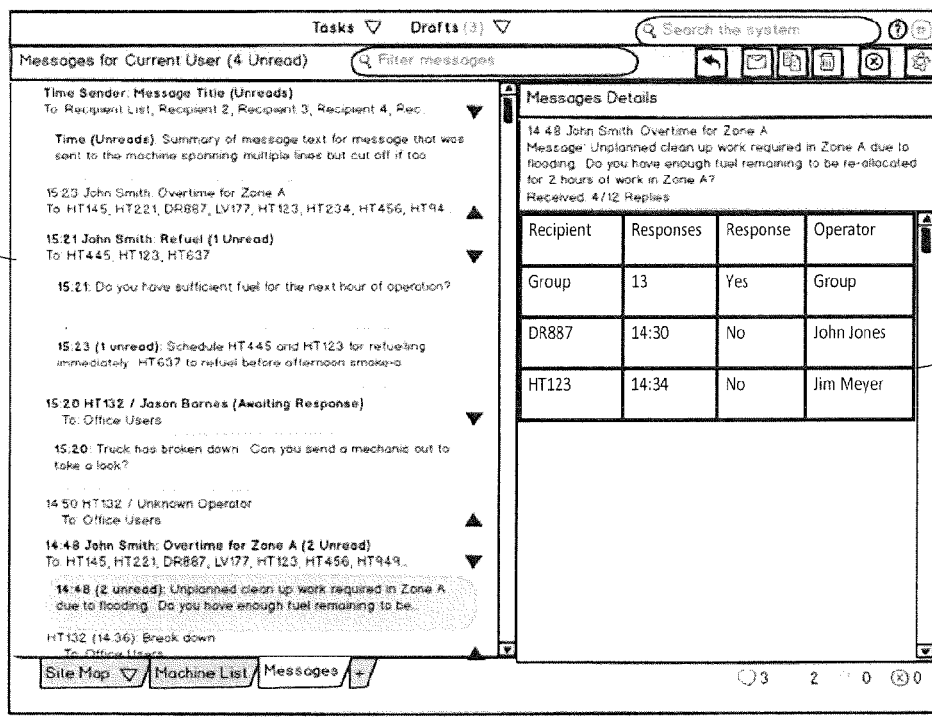
FIG. 13 is a screen shot showing a messaging window with grouped responses.

For example, as illustrated in FIG. 13, message responses are shown in window 624 with all 'yes' responses are grouped together and the count of '13' responses is shown. Two other responses with message content of 'no' are shown separately. In this exemplary embodiment, the 'no' response are shown with the vehicle identifier, the time of receipt, the response value ('no') and the name of the operator. Many other screen configurations can be accommodated which retain the concept of grouping either the most prevalent response or the response of less interest to the console operator.

To illustrate further, in an embodiment, the console operator may select a response value to be included in a group, or may select a response to break out individually. Similar to the fuel level illustration above, an operator may request fuel levels in ¼tank increments, e.g. ¼, ½, ¾, and Full. The operator may select to have the three responses ¾ or less grouped together without individual detail and displaying only detail for those responses with the value of 'Full.' Alternatively, the operator may select to have only those responses with the value Full combined into a group, so that each response in the other three groups is explicitly listed. As should be apparent, other combinations are possible.

Returning to FIG. 3 is an illustration a view of a Travel Progress Monitor (TPM) timeline 300 of a portion of the mining environment. The TPM timeline 300 illustrates the progress of machines, e.g., machine 308 travelling from a source, e.g., source 301 (shown on the right) towards a destination, e.g., destination 302 (shown on the left). The progress of a machine 308 may be clearly indicated via a marker 310 on the timeline along with the estimated time until arrival. A machine 304 in active use at the destination 302 may be shown to the left of the destination 302, with the current action indicated. Any estimated times that have been exceeded may increment to indicate how far they have been exceeded by and display a "+" in front (e.g. "+02:17"), for example, machines that have arrived at the destination 302 but are queued for loading.

The timeline 300 displayed contains two linear sections. The primary section 314 illustrates the last 10 minutes of travel for a machine with a fine-level granularity, while the secondary section 316 illustrates the remaining travel time of the machine with a broad granularity. That is, the last 10 minutes of travel are shown in more detail than the rest of the travel time as it may be considered the most important or of the most interest. These last 10 minutes of travel 314 are displayed on the screen to ensure they are placed within the prime viewing position for the user. The amount of real estate used by the primary 314 and secondary 316 sections of the timeline may be adjusted by dragging the handle at the boundary of the two areas within the timeline.

Figure 4:
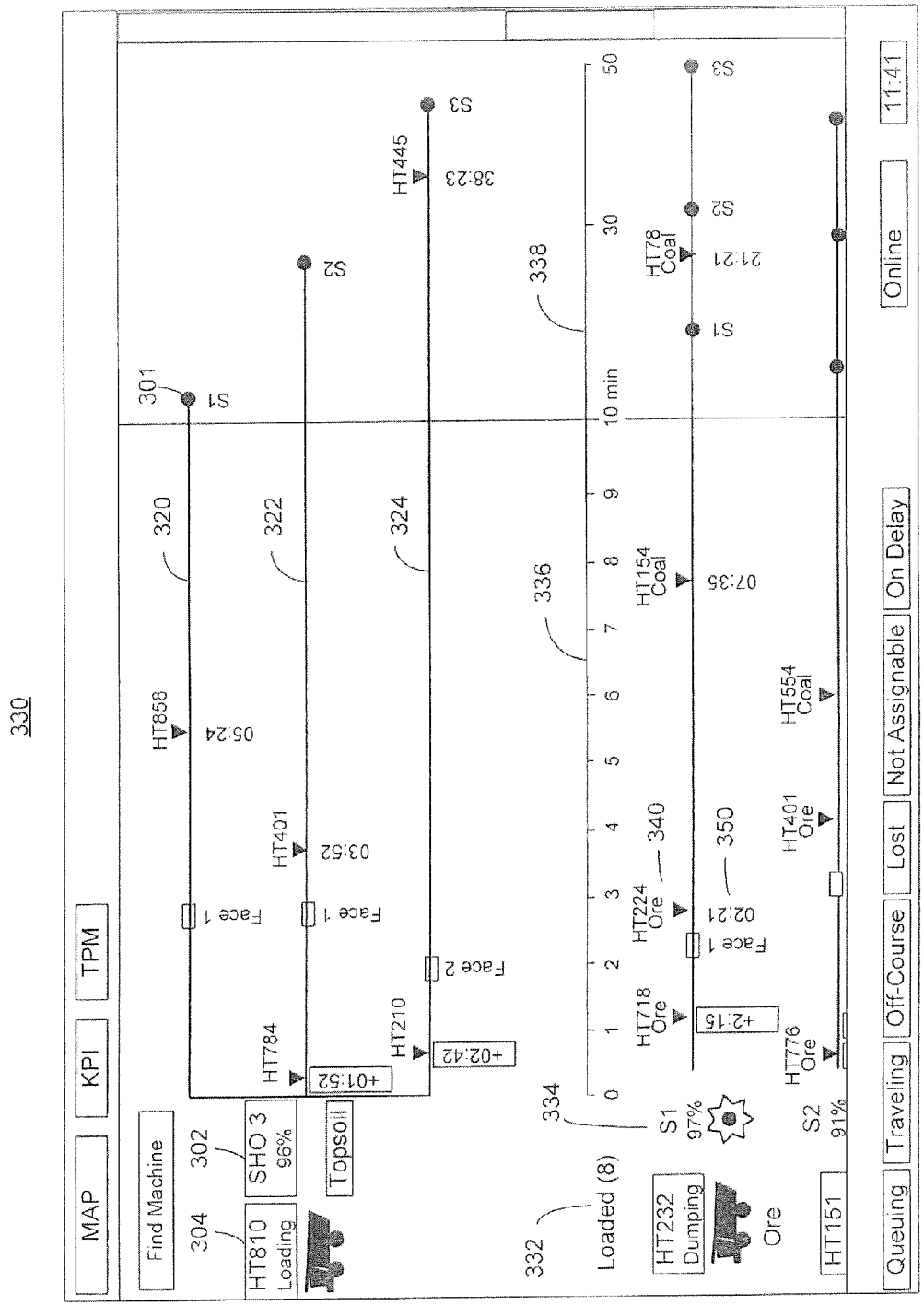
FIG. 4 is an illustration of the travel progress monitor timeline view of
FIG. 7 showing a different portion of the mining environment.
Figure 5:
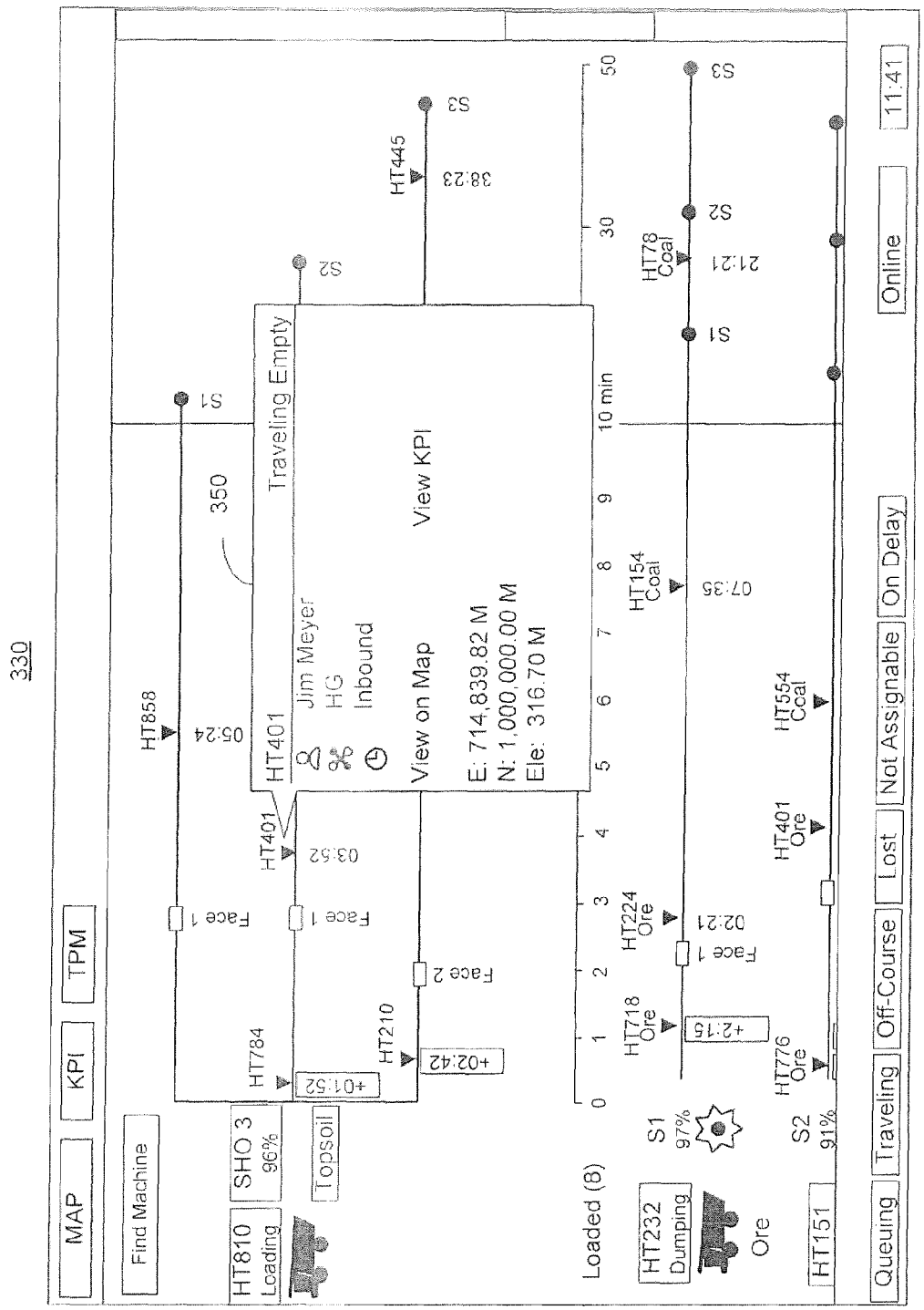
FIG. 5 is an illustration of a display of a travel progress monitor timeline view showing additional information about a selected vehicle.
Figure 6:
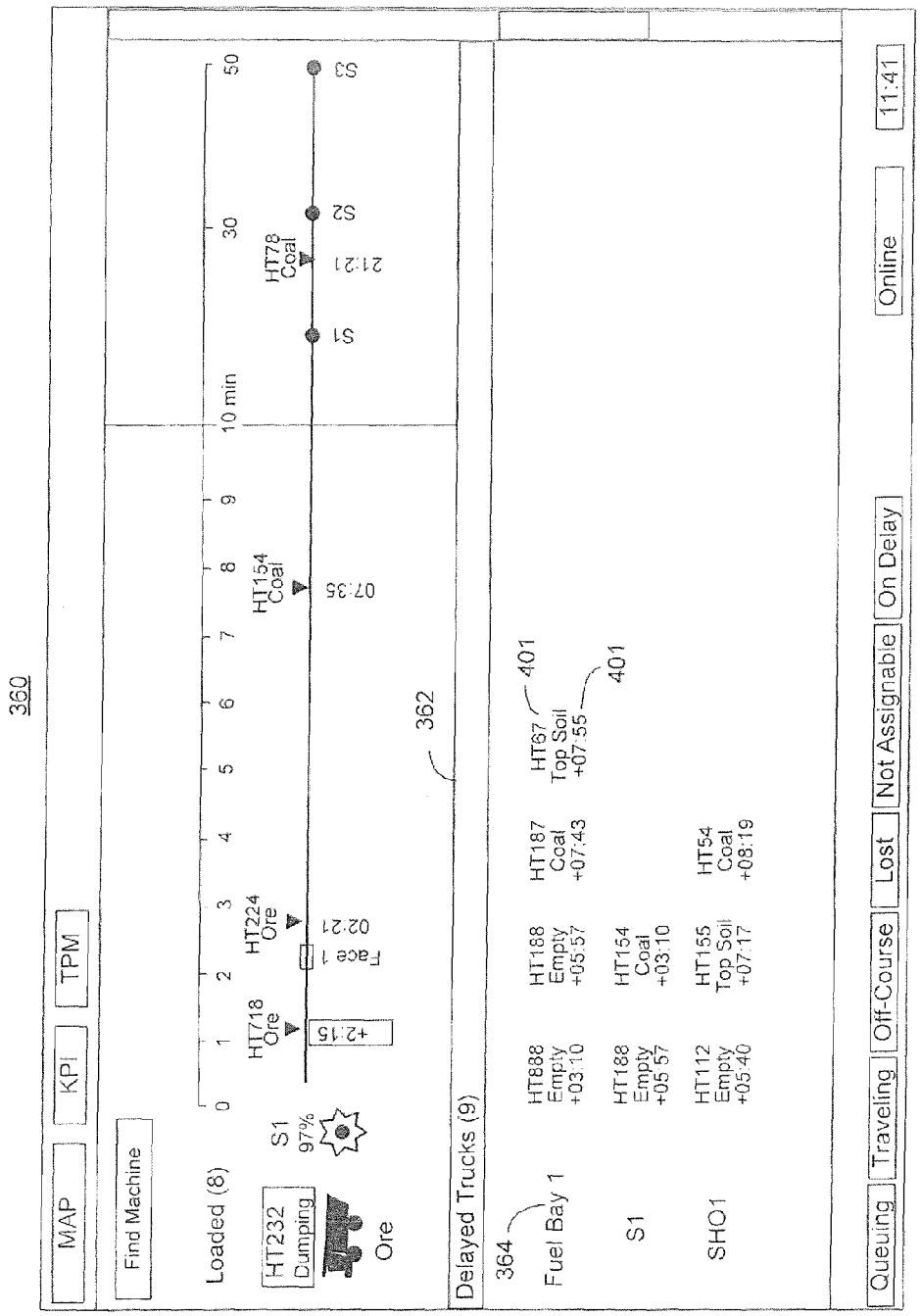
FIG. 6 is an illustration of a display of a travel progress monitor showing delayed vehicles.

If a timeline displays machines that have multiple source locations, that timeline may display the relative positions of those source locations according to the estimated time to travel from those sources. It should be noted that this does not imply that they have similar or overlapping paths, simply that there are machines travelling from these sources. See, for example, the upper timeline associated with destination SHO 1 (Shovel 1).

Where there are multiple sources presented on a timeline, an icon (not depicted) may be selected to expand the timeline to show each source individually, e.g., showing individual timelines 320, 322, and 324 associated with SHO 3 and sources S1, S2, and S3. The machines may appear in the appropriate area of the Travel Progress Monitor timeline 300 depending on their current state. The number of machines displayed within an area may be indicated by a label, e.g., label for empty area 306 in the title bar. The TPM timeline 300 may have multiple sections that are accessible by scrolling through the different areas. FIGS. 4-6 illustrate additional areas shown in the TPM timeline 300.

Figure 3:
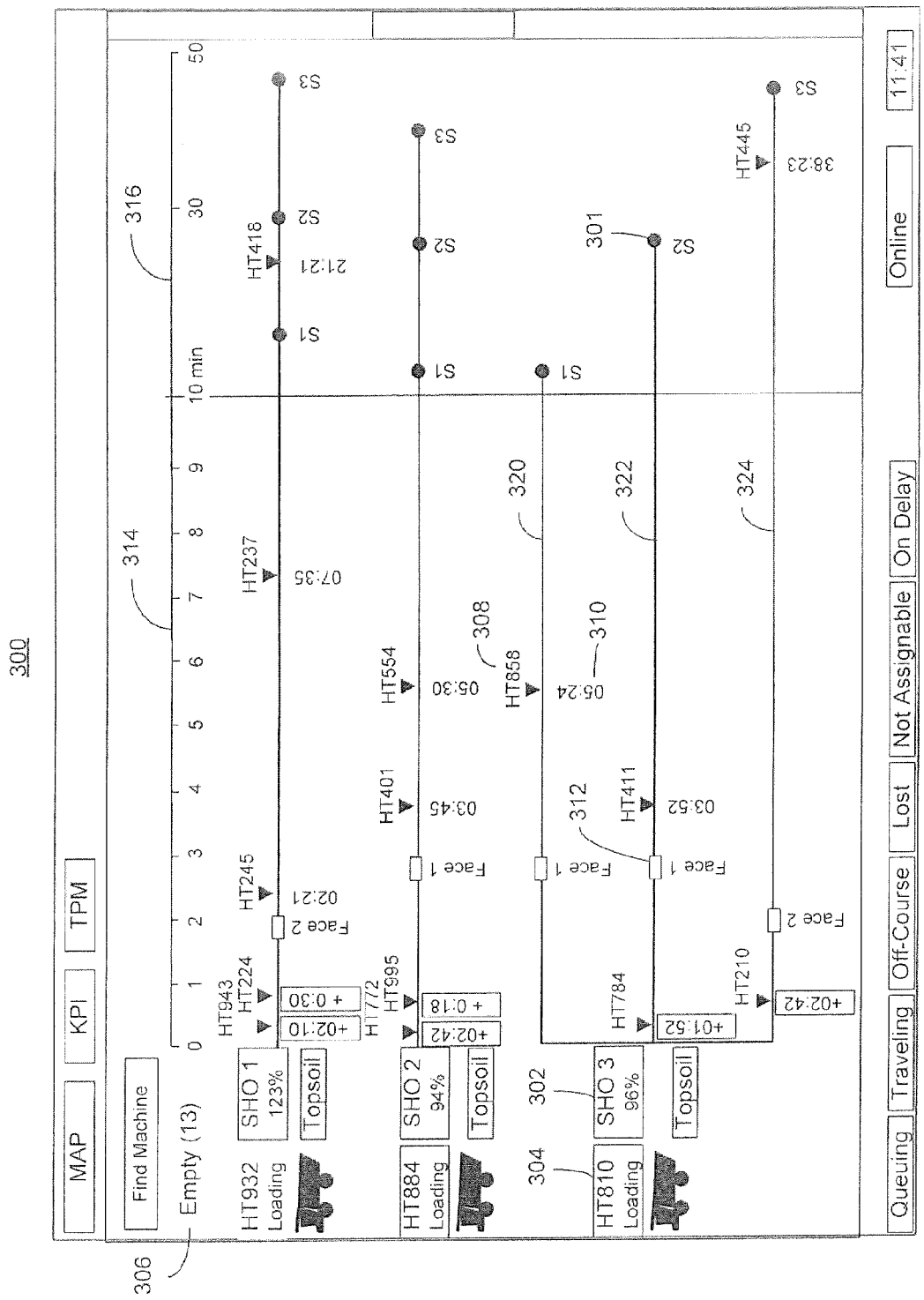
FIG. 3 is an illustration a travel progress monitor timeline view of a portion of the mining environment.

As discussed with respect to FIG. 3, trucks travelling empty may appear in the Empty area 306 travelling towards their assigned loader. They may have a time marker indicating the estimated time until their arrival. As trucks pass through waypoints 312 these estimates are updated to ensure the most accurate estimate possible.

Once a truck has arrived and stopped at a loader their status may be updated to indicate that they have arrived and are queuing. A number of trucks may be queuing for a loader at any one time. Once the loader becomes available, a truck 304 may progress to the Loading state and they may be moved on the display to the left of the loader 302 to allow the utilization of the loader to be illustrated.

To ensure the most important loaders are seen first, the loaders are presented according to priority, with the largest loading tools presented at the top of the displayed list. Each loader has their utilization percentage and may also include estimated load time remaining presented. If a machine goes on delay while travelling empty, they may be removed from the Empty area and moved to the Delayed area of the Travel Progress Monitor, see FIG. 6.

If a loading tool is selected in the Empty area, the following information may be presented in a summary popup: the material being loaded and the current mining block, the destination, and whether the loading tool is over trucked, correctly trucked, under trucked, or has an indeterminate trucking level.

If a truck that is travelling is selected, a summary popup may present additional information about where the truck is coming from, its location, load status (empty or loaded), and additional options for viewing. See, e.g., popup 350 of FIG. 5.

Turning to FIG. 4, another view 330 of timeline 300 is illustrated. View 330 shows the timeline 300 scrolled to show the bottom of the empty truck area 306 and the beginning of the loaded truck area 332. Trucks travelling loaded may appear in the Loaded area travelling towards their assigned processor with an indication of the type of material they are carrying. They may have a time marker indicating the estimated time until their arrival. As above, the source, for example, the loader 302 of the empty truck area, is illustrated on the right of the screen and the destination, for example, processor 334, is illustrated on the left.

Once a truck has arrived and stopped at a processor 334 their status may be updated to indicate that they have arrived and are queuing. A number of trucks may be queuing for a processor 334 at any time. Once the processor 334 becomes available, a truck may progress to the Dumping state and they may be moved on the display to the left of the processor to allow the utilization of the processor 334 to be illustrated. A number of trucks may be dumping at any time (depending on the processor). This may be illustrated by a stacked list of trucks on the left-hand side beside the processor.

To ensure the most important processors are seen first, the processors are presented according to priority, with the largest processors presented at the top of the displayed list above the dumps. Each processor has their utilization percentage (if available) and may also show an estimated service time remaining.

If a processor is selected in the Loaded area, destination information may be presented in a summary popup. If a truck travelling loaded is selected, the following information may be presented in a summary popup: payload size and mining block.

Unlike the Empty and Loaded areas, if a truck goes on delay while at a station it may remain displayed against that station (along with appearing in the Delayed area) with their delay status clearly indicated along with the estimated time of their delay.

Turning to FIG. 6, another view 360 of the timeline 300 is illustrated. If a machine goes on delay while travelling, they may be removed from the Empty area 306 or Loaded area 332 and moved to the Delayed area 362 of the Travel Progress Monitor timeline 300.

In an embodiment, trucks may flagged themselves as being on delay and may subsequently be presented in the Delayed Trucks area 362. Each truck may be placed beside a marker indicating its last known location, for example, fuel bay 364. If a truck is not positively identified as being on delay, its last known location may be used. For example, if the truck was known to be at a loader when it went on delay, it would appear next to a marker for that loader.

Trucks that have an unknown status may be presented in an Unknown area similar to that of the delayed truck area 362. Each truck may be placed beside a marker indicating its last known location. If no location is known, the truck may be placed against an Unknown marker within that area.

Colors may be used on either the timeline view or an overhead map view to indicate states. The following states and their respective colors may be used for trucks:
Queuing (green) (i.e. truck has stopped on a final road segment)
Travelling/Dumping/Loading (black in bright mode, white in dark mode)
Off-Course (orange)
Lost (pink)
Not Assignable (red)
On Delay (grey)

The following states are represented for loading tools and processors: Servicing (white), On Delay (grey).

These status indicators and colors are only illustrative of an embodiment and other status indicators and colors may be used to suit a particular application or installation.

In an embodiment, the list of machines displayed may be filtered by both Fleet and Assignment group using a Filter option. Only machines that form part of the selected fleet or group would then be displayed in the Travel Progress Monitor.

Figure 7:
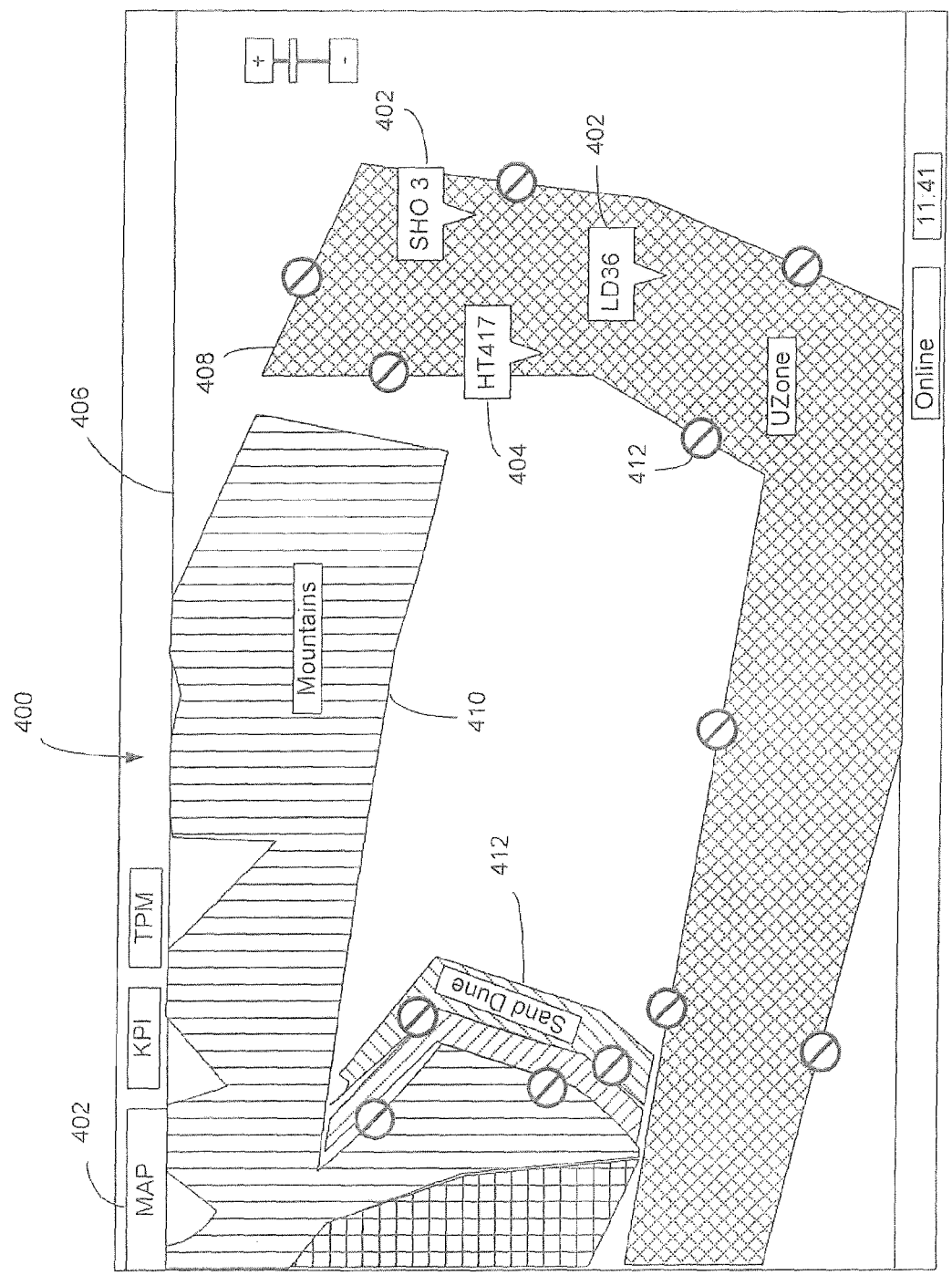
FIG. 7 is an illustration of an overhead map of a portion of the mining environment.

FIG. 7 is an illustration of an overhead map 400 of a portion of the mining environment. This may be viewed by selecting the Map navigation option 402 in the title bar area of any location-related screen. The overhead map 400 may displayed separately or may be displayed concurrently with the TPM timeline 300. The map 400 presented may show a fleet-based monitoring view of the site and may display the following: machines 402, trucks 404, site boundary 406, mining blocks 408, features 410, and hazards 412, although this is not an exhaustive list.

The locations and other information presented on the map 400 may be updated dynamically as changes are detected, particularly machine locations and status colors. By default, the map may be zoomed to show the current mine boundary.

Figure 8:
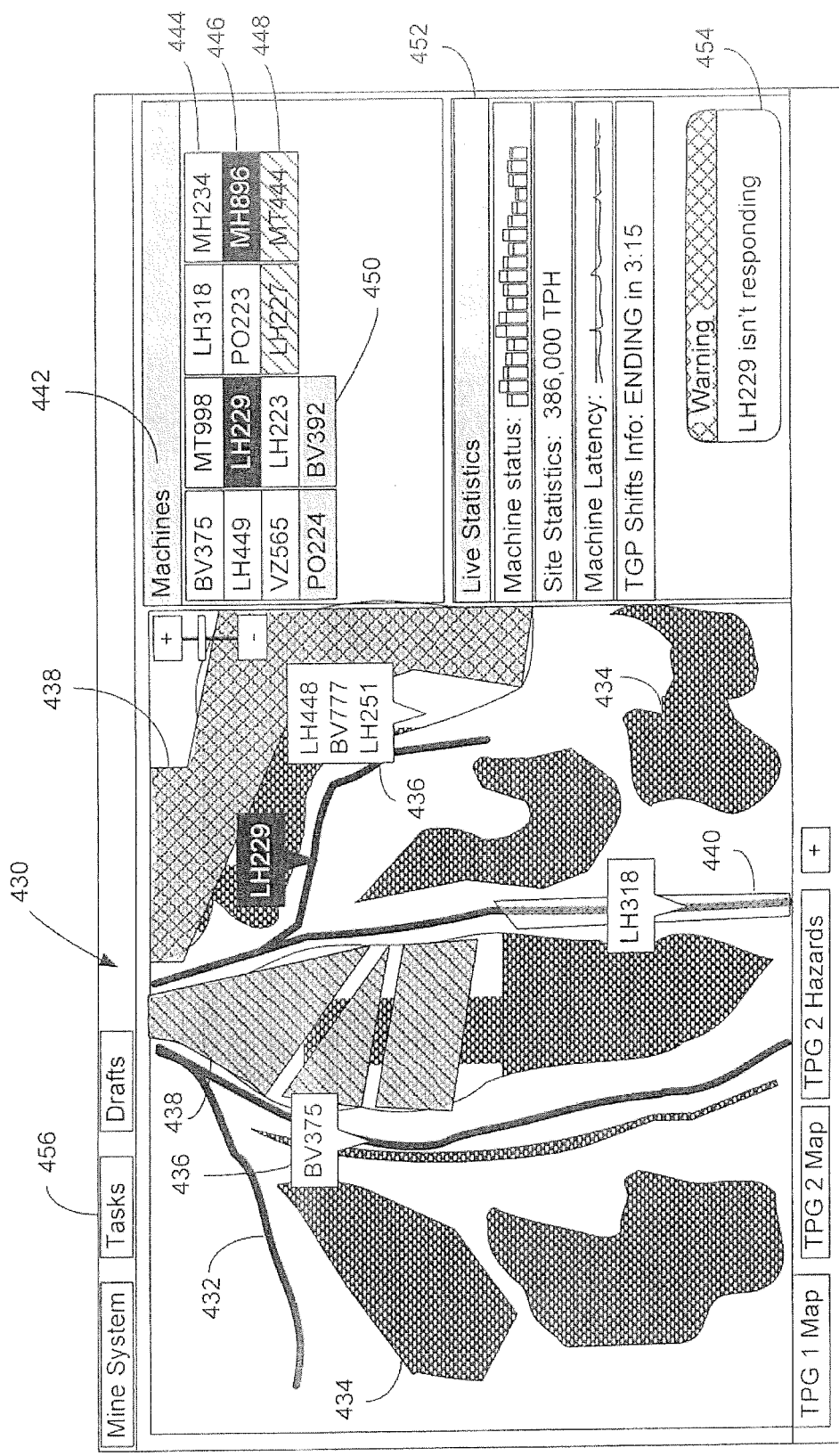
FIG. 8 is an illustration of a display of an overhead map showing vehicle locations, hazard areas, machine status indicators, and a warning.

FIG. 8 is an illustration of a display of an overhead map 430 showing vehicle locations, hazard areas, machine status indicators, and a warning. The map 430 may include roads 432, mining blocks 434, hazards 438, and speed zones 440. As discussed above, the information on the map 430 may be changed dynamically. For example, the speed zone 440 may be a road area that was recently watered down and may have a reduced speed until the surface has sufficiently dried to allow normal operating speeds to resume.

A machines area 442 may indicate a complement of machines and their status. For example, a first color 444 normal operation, a second color 446 may indicate a machine that should be working but isn't. A third color 448 may indicate a machine that is working below capacity, for example, its engine is hot and the machine is working at a reduced rate. Another color 450 may indicate machines that are shut down or their onboard computers are shut off. Any machine may be selected to retrieve additional status for that machine.

A statistics area 452 may be a summary of machine operating actual vs. capacity, site statistics, and other operations-related information. A warning area 454 shows machine-specific information that meets a pre-selected criteria for flagging. A tasks tab 456 may be used to access additional functions of the mining operations control environment.

Figure 9:
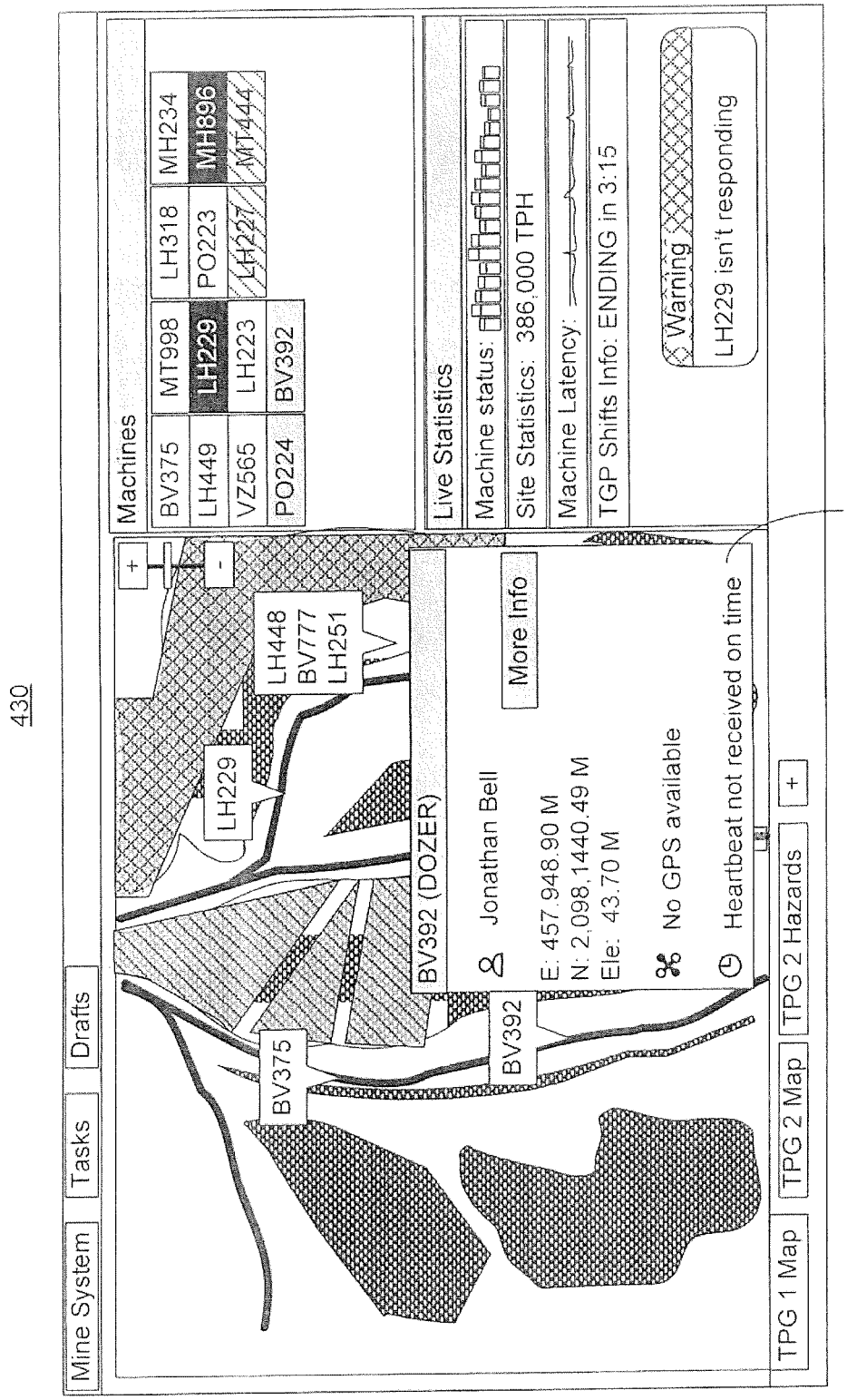
FIG. 9 is an illustration of the display of FIG. 4 showing additional information about a selected vehicle.

FIG. 9 illustrates the map 430 of FIG. 8 showing a popup 460 with additional information about a selected vehicle.

INDUSTRIAL APPLICABILITY

Figure 10:
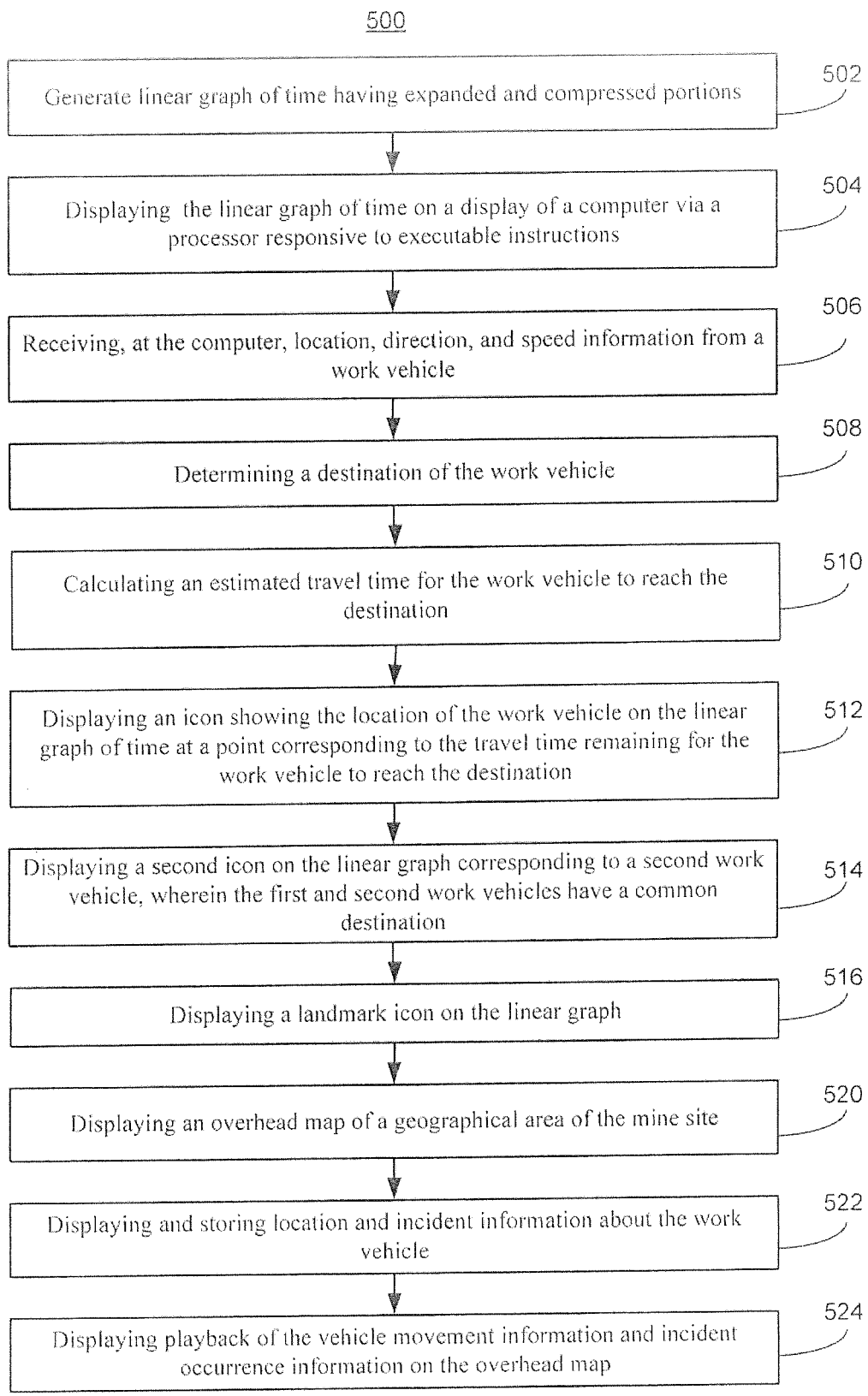
FIG. 10 is a flow chart of a method of using a computing device to create a user interface for a mining operation.

FIG. 10 is an illustration of a method 500 of using vehicle location information in a mining environment. At block 502 a timeline 322 may be generated at a processor of a server/workstation 200 or portable computing device 100. The timeline 322 having an expanded portion 314 adjoining and not overlapping a compressed portion 316, the compressed portion 316 representing more time per unit length than the expanded portion, the timeline 322 having a first end 301 corresponding to a first location of a first work function and a second end 302 corresponding to a second location of a second work function.

At a block 504, the timeline may be displayed on a display of a server/workstation 200 or portable computing device 100 responsive to executable instructions stored in a memory accessible by the server/workstation 200 or portable computing device 100. FIGS. 3-6, discussed above, illustrate various features of the timeline 322 in conjunction with the display of additional timelines.

At a block 506, at least some combination of a location, direction, and speed information are received from a work vehicle at the computer, that is, the server/workstation 200 or portable device 100. The location-related information may come from an onboard Global Positioning System, from signpost location devices, or may be calculated using radio signal triangulation techniques, known in the industry.

At a block 508, a destination of the work vehicle may be determined. The destination may correspond to one of the first location and the second location associated with the timeline 322. In the exemplary embodiment, the first and second locations are a loading point and a dumping point for a dump truck or other material transport vehicle. If the truck is empty, its destination is an assigned loader site, such as a shovel 302. If the truck is loaded, its destination is an assigned processing point or dump site 301. On board sensors, operator input, a dispatcher, or on-site observers may be used to indicate load status, destination information, or both.

If the destination is a location other than one of those designated for the current timeline 322, another timeline, e.g., timeline 324 may be generated accordingly.

At a block 510, an estimated travel time for the work vehicle to reach the destination may be calculated. In an embodiment, the current location and known location of the destination may be used to determine the remaining distance and the current speed may be used to calculate the remaining travel time. Alternatively, several mechanisms can be used to determine the remaining travel time. For example, using the current location and known speed limits for remaining segments of the route may be more accurate for calculating travel time to the destination rather than simply using current speed. Such calculations also allow for determining if the vehicle is ahead or behind an expected arrival time.

At block 512, an icon may be displayed showing the location of the work vehicle on the timeline at a point on the timeline corresponding to the travel time remaining for the work vehicle to reach the destination. Unlike a simple distance-based display, showing the location based on travel time to destination quickly allows a dispatcher, field supervisor, or other personnel to identify potential bottlenecks while there is still time to divert vehicles to other destinations for better balance.

In an embodiment, the icon may be colored to correspond to a condition of the vehicle, as discussed above, or may be colored to highlight a status of the vehicle such as off-track, queued, and traveling. The queued status may also include showing a time on station at the destination.

At block 514, additional vehicles may be displayed using separate icons showing vehicles on the same timeline as the first work vehicle. In different embodiments, the different vehicles may have a common destination and different starting points.

At block 516, a landmark icon 312 may be displayed on the timeline 322. The location of the landmark icon may be placed at a location calculated as the travel time for the work vehicle moving at the speed limit or limits from that point for the work vehicle. When a vehicle passes the landmark 312, its expected time to arrival may be updated according to the known travel time from that location. In some embodiments, different vehicles may have different speed limits, so the estimated time to arrival may be adjusted by vehicle type and different vehicles may have different times from the same landmark.

At block 520, an overhead map 430 of a geographic area of the mine site may also be displayed. The overhead map 430 may be either a satellite image or a "street map" and may include overlays indicating one or more of roads 432, mining blocks 434, hazards 438, etc. In an embodiment, a tool may be used to create and geographically locate hazard indicators on the map 430 corresponding to physical areas at the mine site. Additionally, criteria and/or alerts associated with the designated areas may be set for use when vehicles travel in those vicinities. For example, an alert may be sent to a driver who is exceeding a speed limit or who is approaching a hazard area based on the boundaries and rules established during the map creation or maintenance.

At block 522, an icon of the work vehicle may be displayed on the overhead map 430 showing a physical location of the work vehicle and may also display incident information at a location on the map where the incident occurred. For example, all vehicle travel may be displayed and stored along with any incident information. For example, vehicles may be monitored when traveling at too high a speed or when passing too close to each other or a hazard.

At block 524, vehicle movement information and incident occurrence information over a specified prior time period may be retrieved from memory and played back in order to confirm violations or for training of operators.

Figure 14:
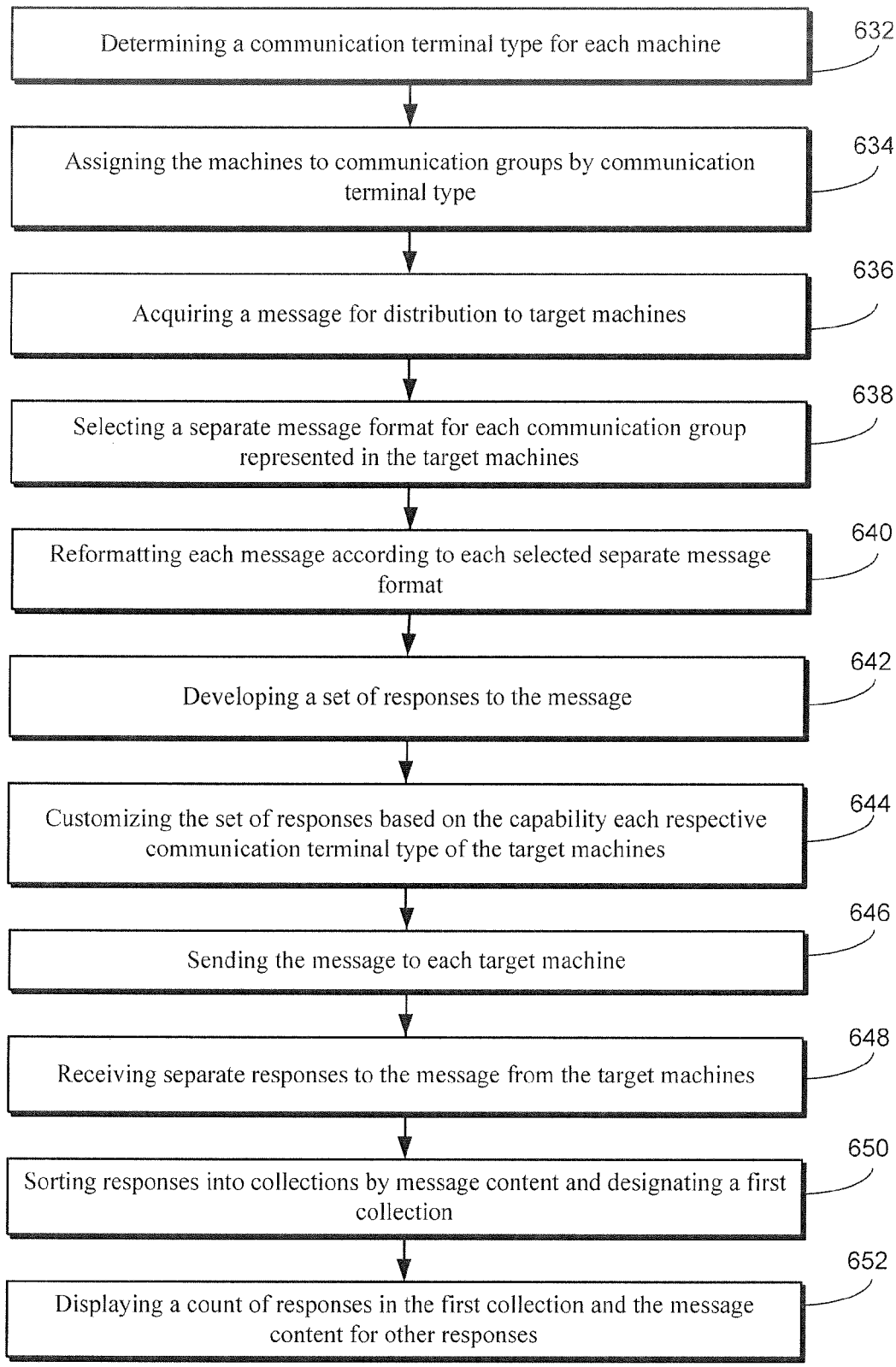
FIG. 14 is a method of sending and receiving messages using a customized protocol.

FIG. 14 illustrates a method 630 of preparing, sending, and receiving messages from machines in a mining environment. At a block 632, A communication terminal type for each machines capable of data communication in the mining environment may be determined. The determination may be made by reference to a database of equipment in each machine, by reference to a type of machine, etc.

At a block 634, the machines may be assigned to communication groups by the communication terminal type. That is, machines with the same terminal type may be grouped together for use in later steps when customizing messages. In some cases a particular machine may be assigned to a communication group based on a display characteristic of the communication terminal type since this may be a major factor in how a message content is to be displayed. However, other factors, such as keyboard configuration may also be included in decisions regarding assignment to communication groups. In other embodiments, communication groups may be assigned not only by communication terminal type but also by machine type, so that specific message content may be filtered when being sent to different machines having the same terminal type.

At a block 636, a message may be acquired for distribution to one or more machines that are targeted for receiving the message. The message may be entered by an operator manually, may be selected from a list of canned messages, or may be generated automatically by a dispatching or other control system based on other status indicators in the mining environment.

At a block 638, a separate message format may be selected for the message for each communication group represented in the target machines. That is, if 8 machines are targeted with those machines falling in three different communication groups, message formats specific to the communication terminal types represented by those three groups would be selected. To illustrate, the formats may include a 4 line×80 character format, a laptop with keyboard format, and a tablet with touchscreen format.

At a block 640, the message may be reformatted according to each selected separate message format. That is, graphics may be removed from the 4 line format and landscape graphics for use on the laptop may be reformatted to a portrait orientation for use on the tablet.

In another embodiment, reformatting the message may be done in a different manner, where canned messages may be pre-loaded on each communication terminal so that reformatting is more of a process of matching the message to the pre-loaded message and determining a message identifier for the matching pre-loaded message. When the message is sent to each target machine, the reformatting may include adding the identifier and removing at least a portion of the original message content.

At a block 642, when the message requires or requests a response, a set of responses to the message may be developed. In various embodiments the responses may be sent with the message or preloaded on the communication terminals 100.

At a block 644, each message in the set of responses may be customized based on the capability of the communication terminal type in each communication group. The customizing may include limiting the set of responses to a number of input keys available for the communication terminal type. For example, if the communication terminal 100 has only 4 keys, the response options may be pared to four. If a full keyboard is available, the set of responses may be virtually unlimited. If the responses are preloaded, they may be customized before preloading given a reference number for use in referencing in the outbound message. That is, if a communication terminal has, for example, 50 preloaded response messages, the outbound message to a four key terminal may indicate that responses 4, 8, 10, and 11 are to be presented to the user for selection.

At a block 646, the message may be sent to the machines. Sending the message may include sending the message and, as discussed above, a customized set of responses based on communication group. Various techniques may be used to get the messages to the target machines, such as addressing, polling, or group broadcasting with local screening at the communication terminal 100. Delivery mechanisms are not discussed here in more detail.

At a block 648, separate responses to the message may be received from the machines that were sent messages.

At a block 650, the separate responses may be sorted into collections by message content. That is, all responses with the same message content or having the same response identifier, if used, may be grouped, for example, into collections or sets.

A first collection of separate responses may be designated. In general, the first collection are those responses that are either expected or include the highest number of identical or similar responses. In some cases designating the first collection involves preselecting a message content for use as the first collection, such as having an operator designate that all 'yes' responses will be put in the first collection. In other embodiments, a filter criteria may be applied to the message content, as discussed above. All the messages meeting, or failing to meet, the filter criteria may be designated in the first collection. Ongoing use may help in designating the first collection filter criteria by using an analysis of previous separate responses. For example, after time, operators may learn that at the end of a shift, most truck drivers would be willing to work overtime and all yes answers to a query about working overtime would be put in the first collection.

At a block 652, only a quantity of separate responses in the first collection may be displayed and the message content of the separate responses other than those in the first collection. As discussed above, using the overtime query example, only the quantity of 'yes' responses may be displayed and the individual message text and vehicle/operator for all 'no' responses may be individually displayed. This saves screen clutter and helps the dispatcher or operator see the response data more clearly, enabling quicker and more accurate decision making.

The ability to capture, store, and replay real time events at a mine site, as well as being able to graphically display the time to arrival of work vehicles at a destination gives mine operators and improved ability to better manage the very expensive resources at their disposal. By avoiding bottlenecks and dead time at destinations, machines such as loaders can be kept in operation while keeping vehicles on the road delivering material.

Allowing hazard and alert areas to be graphically created on a map and then storing vehicle traffic and incidents for replay gives managers tangible evidence for both instruction and discipline, creating a safer and more efficient work site.

We claim:

1. A method of communicating messages with machines having a communication terminal in a mining environment, the method comprising:
    determining a communication terminal type for machines capable of data communication in the mining environment;
    assigning the machines to communication groups by communication terminal type;
    acquiring a message for distribution to one or more machines;
    selecting a separate message format for the message for each communication group represented in the one or more machines;
    reformatting the message according to each selected separate message format; and
    sending the message to the machines.

2. The method of claim 1, wherein assigning communication groups by communication terminal type comprises assigning communication groups by communication terminal type and machine type.

3. The method of claim 1, further comprising developing a set of responses to the message.

4. The method of claim 3, further comprising customizing the set of responses based on the capability of the communication terminal type in each communication group.

5. The method of claim 4, wherein sending the message to the one or more machines comprises sending the message and a customized set of responses based on communication group.

6. The method of claim 3, wherein customizing the set of responses to the message comprises limiting the set of responses to a number of input keys available for the communication terminal type.

7. The method of claim 1, wherein assigning the machines to communication groups by communication terminal type comprises assigning a particular machine to a communication group based on a display characteristic of the communication terminal type.

8. The method of claim 6, further comprising preloading and assigning a reference number to each response in the set of responses.

9. The method of claim 1, further comprising:
    receiving separate responses to the message from the machines;

sorting the separate responses into collections by message content;

designating a first collection of separate responses;

displaying a quantity of separate responses in the first collection; and displaying the message content of the separate responses from a collection other than the first collection.

10. The method of claim 9, wherein designating the first collection of separate responses comprises designating as the first collection a collection having a highest number of separate responses.

11. The method of claim 9, wherein designating the first collection comprises preselecting a message content for use as the first collection.

12. The method of claim 9, wherein designating the first collection comprises applying a filter criteria to the message content of the separate responses and displaying only those separate responses whose message content meets the filter criteria.

13. The method of claim 12, further comprising displaying the count of the separate responses whose message content fails to meet the filter criteria.

14. The method of claim 9, wherein designating the messages comprises designating the first collection based on an analysis of previous separate responses.

15. The method of claim 1, wherein reformatting the message comprises:

pre-loading message text on the communication terminal;

matching the message to the pre-loaded message;

determining an identifier for the pre-loaded message; and reformatting the message to include the identifier and remove at least a portion of the message text.

16. A communication platform for communicating messages to and from a plurality of machines used in a mining environment, the communication platform comprising:

a server having a physical memory, a processor, a user interface, and a network interface configured to send and receive messages via a network, wherein the physical memory stores executable instructions and data that are used by the processor to cause the communication platform to:

receive, via the user interface, a message to be sent to the plurality of machines;

maintain characteristics of a message capability for each of the plurality of machines;

transform the message according to the message capability of a target machine of the plurality of machines; and sending the transformed message to the target machine.

17. The communication platform of claim 16, further comprising:

a communication terminal associated with each of the plurality of machines, each communication terminal including:

a display;

an input device;

a processor coupled to the display and input device; and a memory coupled to the processor, the memory storing instructions that are used by the processor to cause the communication terminal to:

receive the transformed message;

display at least a portion of the transformed message on the display; and capture response information via the input device.

18. The communication platform of claim 17, wherein the transformed message includes pre-determined response messages based on the message capability of the target machine.

19. A method of communicating messages with machines having a communication terminal in a mining environment, the method comprising:

determining a communication terminal type for machines capable of data communication in the mining environment;

assigning the machines to communication groups by communication terminal type and machine type;

acquiring a message for distribution to one or more machines;

selecting a separate message format for the message for each communication group represented in the one or more machines;

developing a set of responses to the message;

customizing the set of responses based on the capability of the communication terminal type in each communication group;

reformatting the message according to each selected separate message format; and sending the message and a customized set of responses based on the communication group to the machines.

20. The method of claim 19, wherein customizing the set of responses to the message comprises limiting the set of responses to a number of input keys available for the communication terminal type.

\* \* \* \* \*